L. COTE.

Improvement in Heel-Trimming Apparatus.

No. 4,973. Reissued July 16, 1872.

Witnesses,
Charles E. Chunn
S. J. Royce.

Assignee

Inventor:
Louis Coté by
H. M. Beach atty.

A.M. PHOTO-LITHOGRAPHIC CO. N.Y. (OSBORNE'S PROCESS.)

UNITED STATES PATENT OFFICE.

LOUIS COTÉ, OF ST. HYACINTHE, ASSIGNOR OF ONE-HALF INTEREST TO CHARLES E. SEYMOUR, OF MONTREAL, CANADA.

IMPROVEMENT IN HEEL-TRIMMING APPARATUS.

Specification forming part of Letters Patent No. 109,300, dated November 15, 1870; reissue No. 4,973, dated July 16, 1872.

SPECIFICATION.

*To all whom it may concern:*

Be it known that I, LOUIS COTÉ, of the city of St. Hyacinthe, in the district of St. Hyacinthe, in the Province of Quebec, Canada, have invented an "Improved Hand Apparatus for Trimming Heels of Boots and Shoes;" and I do hereby declare that the following is a full, clear, and exact description of the construction and operation of the same, reference being had to the annexed drawing, where—

Figure 1:
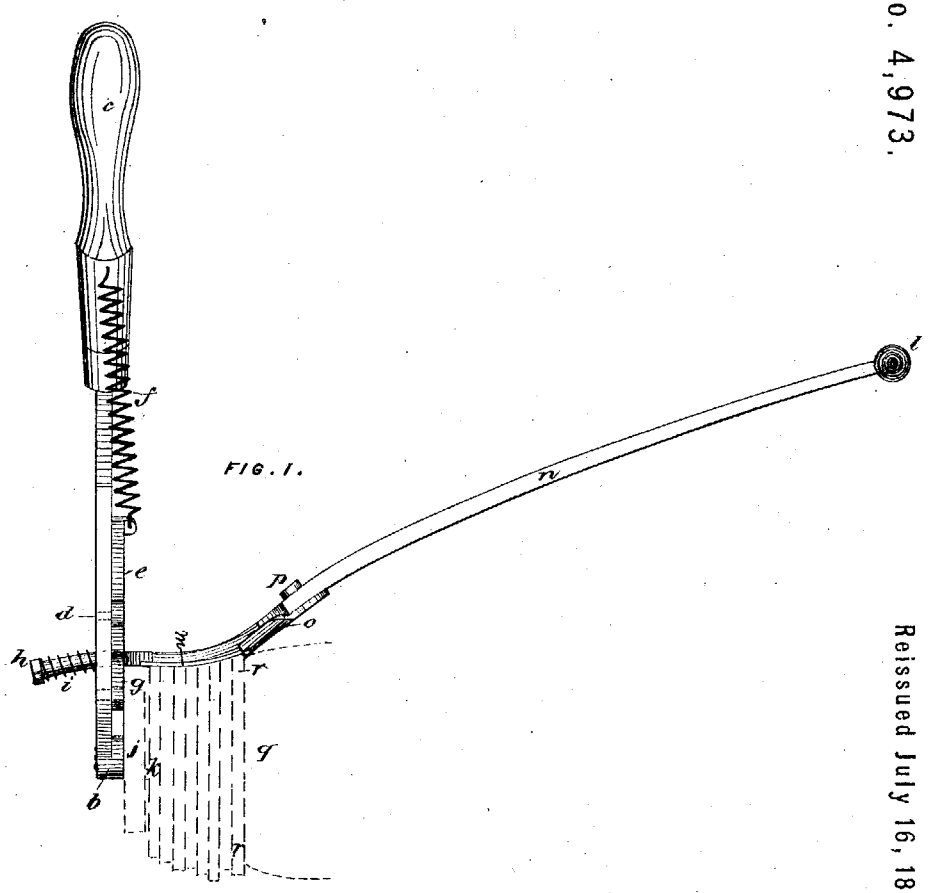
Figure 2:
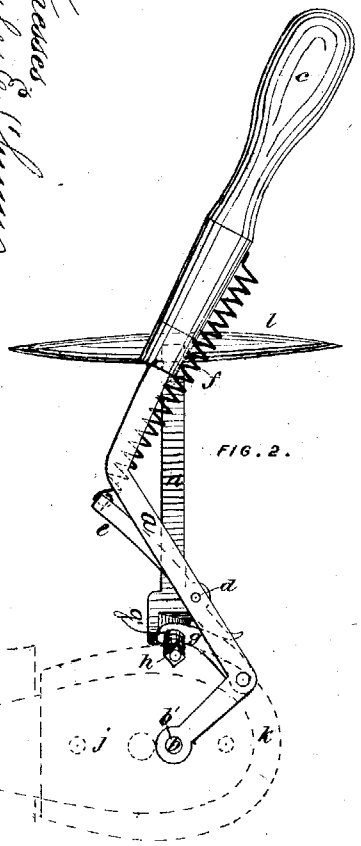

Figure 1 represents a side elevation of the apparatus. Fig. 2 represents an end elevation of the apparatus.

This invention is designed for use by hand with the boot-and-shoe-holding machine shown and described in the United States Letters Patent No. 104,560, granted to me June 21, A. D. 1870, or with any suitable apparatus which, while it holds a boot or shoe firmly, is provided with a center-pin to which to connect my trimming apparatus, so that it can be moved around the convex outline of a heel and a guide-plate located on the heel-tread to supply one of the two guides needed, the other guide being formed on the counter of the shoe itself.

In the drawing hereunto annexed, similar letters of reference indicate like parts.

The dotted lines shown in Figs. 1 and 2 represent parts of a boot or shoe to be operated upon, the guide-plate *k* upon the tread of the heel, and the piece *j*, which receives the guide-plate. This is provided with the pivot or center, about which my apparatus is carried. *a* is a lever of the form shown in the drawing, provided with an eye or socket, *b'*, made to fit upon the pivot-pin *b*, the other end of the lever being supplied with a suitable handle, *c*. To this the workman applies most of the force necessary to make the knife perform its function of cutting. To the lever *a* is pivoted, at *d*, the lever *e*, having one end connected to the lever *a* by a spring, *f*, the other end being kept forced by the spring *f* against the radius-arm *g*. In this is formed a pivot-hole, *g'*, for receiving the end of the knife-carrier, which is provided with a nut, *h*, and spiral spring *i* on its end, as shown in Figs. 1 and 2, for holding the knife-carrier in place. The arrangements shown allow of endwise movement of the knife.

The knife-carrier is constructed as follows: To a lever or bar, *n*, of the form shown in the drawing, and provided as hereinbefore described to connect with the hole *g*, is attached at the other end any suitable handle, *l*, to keep the edge of the knife at a proper angle to the path of its movement with one hand while the lever *a* is operated with the other hand of the workman. The manner of attaching the knife-blade *m* to *n* is by means of screws. The blade itself and manner of attaching it are very similar to that of an ordinary "spoke-shave," used by wheelwrights, only that the part of the carrier is removed from over the blade. In the carrier *n*, and as indicated in the drawing, a slot-hole is formed for connecting adjustably, by means of a screw, *p*, a plate, *o*, which serves the double purpose of a guard and gauge to rest on the counter *q*. The end of *o* bears against the upper edge of the sole *r* on the surface nearest to the counter, the spring *i* allowing of sufficient end motion to compensate for the variation of height of the heel from front to rear, and keeping the end edge of the guard *o* in close contact with the sole *r*. It will therefore be seen that while one end of the knife-blade *m* is kept close to the plate *k* by the action of the spring *f* and lever *e*, the other is kept from cutting too deeply by the guard *o*, which is pressed down by the hand holding the handle *l*.

From the foregoing it will be seen how a workman can rapidly and perfectly shave smooth a rough heel attached to a lasted boot or shoe by means of the described apparatus in connection with any device, apparatus, or machine which presents a pivot or center for the lever *a*, a tread-guide plate, *k*, and means of holding the boot or shoe in position. By one continued movement a cut is made around the curve of the heel, reducing the rough sides to the desired shape and size, the counter being at the same time protected from the risk of being cut by the knife.

For heels of various heights the guide and guard *o* is adjusted in the slot so as to cover more or less of the edge of the knife.

I claim as follows:

1. The guard-plate *k* with pivot *b*, and otherwise arranged as described, in combination with lever *a* provided with eye *b'*, arm *g*, lever *e*, pivot *d*, and spring *f*, substantially as set forth.

2. The lever *a* with its attachments, constructed and arranged as described, in combination with the knife-carrier *n* provided with nut and spring *h i*, knife-blade *m*, guide-guard *o*, and handle *l*, substantially as set forth.

3. The guide-plate *k* with pivot *b*, with lever *a*, and attachments, constructed and arranged as described, in combination with knife-carrier *n* and attachments, constructed and arranged as described, for the purposes set forth.

Montreal, 28th day of February, A. D. 1872.

LOUIS COTÉ.

Witnesses:

JAS. A. LAFERRIÉRE,
BTE. FRÉDÉRIC.